May 8, 1934.  O. WULFERT  1,958,378

ANTIFRICTION BEARING

Filed March 9, 1932

Inventor
Otto Wulfert
By E. O. Huffman
Att'y.

Patented May 8, 1934

1,958,378

UNITED STATES PATENT OFFICE 1,958,378

ANTIFRICTION BEARING

Otto Wulfert, St. Louis, Mo., assignor to Wagner Electric Corporation, St. Louis, Mo., a corporation of Delaware Application March 9, 1932, Serial No. 597,683

6 Claims. (Cl. 308—187)

My invention relates to an anti-friction bearing of the ball or roller type and particularly to one adapted for use in supporting the shaft of an electrical machine, such as a motor or generator.

The object of my invention is to provide means whereby the lubricant can be removed from the bearing and replaced without disassembling the bearing housing and without stopping the operation of the machine.

Figure 1:
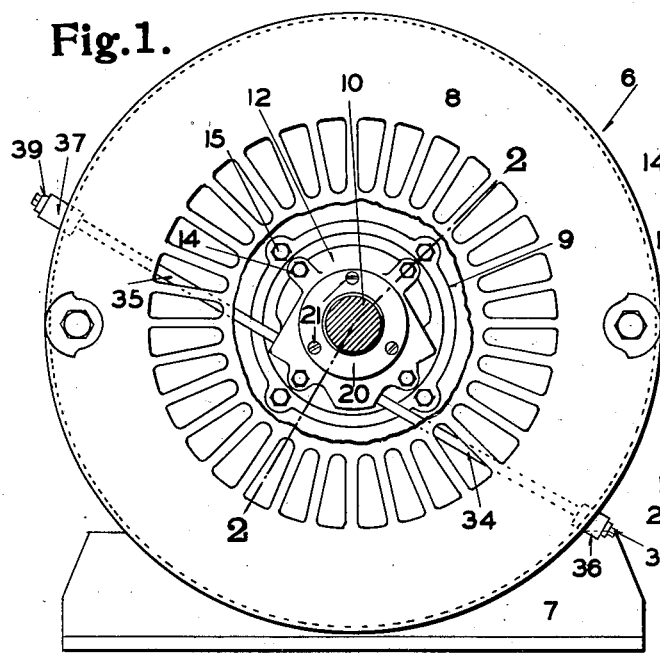
Figure 2:
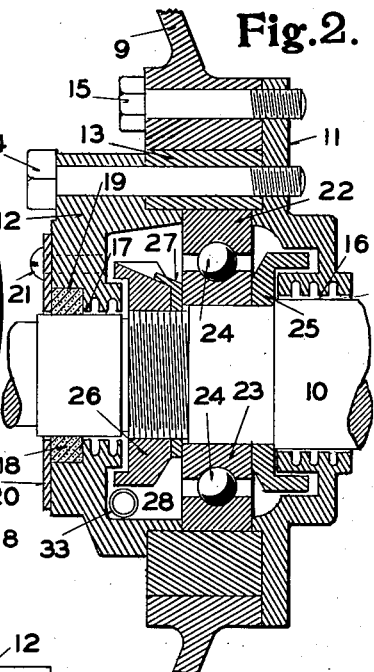
Figure 3:
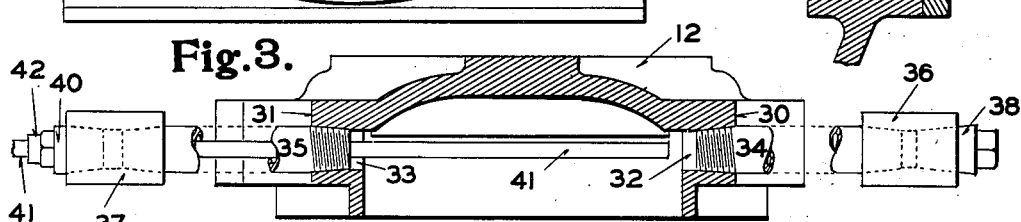
Figure 4:
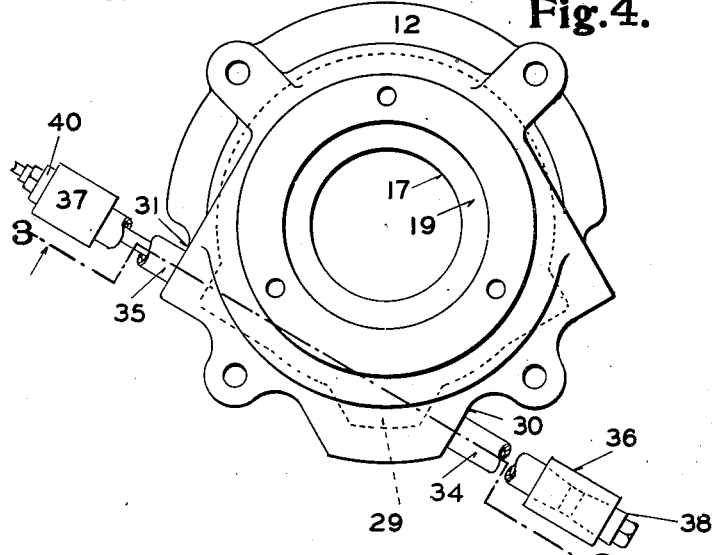
Figure 5:
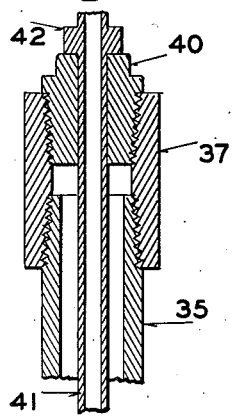

In the accompanying drawing, which illustrates one form of bearing made in accordance with my invention, together with a motor of the totally enclosed ventilated type to which the same is applied, Figure 1 is an end elevation of the motor, the blower shield being partially broken away; Figure 2 is an enlarged section of the bearing taken on the line 2—2 of Figure 1; Figure 3 is a section taken on the line 3—3 of Figure 4; Figure 4 is an enlarged detail view of the outer bearing cap and connection therefor; and Figure 5 is an enlarged section of the upper pipe connection for the cap.

Referring first to Figure 1, 6 is a motor frame mounted on a base 7 and provided with a blower shield 8 and an end plate 9, the latter of which carries a bearing for supporting the rotor shaft 10. It will be understood that a similar bearing is carried by the opposite end plate (not shown).

The bearing, shown in detail in Figure 2, consists of an enclosing housing and an anti-friction device mounted therein. The housing comprises an inner cap 11, an outer cap 12, and a cartridge 13 interposed between the caps. Bolts 14 secure the parts of the housing together and the housing is attached to the end plate by bolts 15. Centrally located in the caps 11 and 12 are openings 16 and 17, respectively, for the passage of the rotor shaft. These openings are of such size as to provide a small clearance, usually from .005 to .01 inch, to prevent the entrance of foreign matter into the bearing, and at the same time not to interfere with the support of the rotor by the anti-friction device. It is essential to the proper functioning of my device that the resistance to the passage of air, around the shaft to the interior of the housing, be greater through the opening 17 than through the opening 16. This result I accomplish by providing a packing 18 of felt or similar material placed in an annular recess 19 in the outer face of the cap 12 and held in place by a washer 20 fastened by screws 21. This packing forms a substantially air-tight joint between the cap and the shaft.

The anti-friction device comprises an outer ball race 22, an inner ball race 23, and balls 24 interposed between the races. The outer ball race is carried by the bearing housing and the inner race is held on the shaft between an inner grease seal 25 and an outer grease seal 26, the latter of which is threaded on the shaft so as to act as a clamping nut and is preferably provided with a nut lock 27.

The interior of the cap 12 is hollow so as to form an air chamber 28 at the outer side of the anti-friction device, which chamber is provided at its lowest point with a sump 29. The exterior of the cap 12 is provided with parallel faces 30 and 31 to facilitate the drilling of a pair of aligning holes 32 and 33. The lower hole 32 enters the sump 29 and the holes are so positioned that their axis passes through the chamber 28 tangentially at a point where the space between them is unobstructed by the shaft or the parts carried thereby. Threaded into the hole 32 is a pipe 34 and into the hole 33 a pipe 35, which pipes extend to the periphery of the motor frame where they are provided with pipe couplings 36 and 37, respectively. Except when the bearing is to be cleaned, the coupling 36 is closed by a plug 38 and the coupling 37 by a plug 39 (Figure 1).

When the lubricant in the bearing requires renewal, the plugs 38 and 39 are removed and the plug 39 replaced by a plug 40, similar to the plug 39 but provided with a central bore to permit the insertion of a tube 41 having a sliding fit in the plug so as to make a substantially air-tight joint therewith. The tube is provided with a stop, such as the collar 42, so as to locate its end adjacent the hole 32. The tube 41 is now attached to a pump or compressed air reservoir (not shown) in order to force the air through the tube which, together with the opening 32, forms an ejector which draws out a part of the air in chamber 28, reducing the pressure therein. Air to restore the normal pressure is prevented from entering the chamber through opening 17 by the packing 18 and hence must enter through the opening 16 and pass through the anti-friction device carrying with it the lubricant therein, which lubricant is expelled through the pipe 34 with the ejected air. When all the lubricant has been removed, the tube 41 is withdrawn and the plug 38 replaced, after which fresh lubricant may be introduced through pipe 35.

When a suction pump is available the function of the ejector may be performed by it. In such case the plug 39 alone is removed and the suction pump attached to the coupling 37 to withdraw air from the chamber 28 through pipe 35.

The operation will be the same except that the lubricant, instead of being expelled through the pipe 34, will collect in it and in the sump 29 from which it may be drawn off after the completion of the operation by the removal of plug 38.

Having fully described my invention, what I claim as new and desire to secure by Letters Patent of the United States is:

1. In a device of the class described, the combination of a shaft, a bearing housing surrounding said shaft, an anti-friction device in said housing, said housing being provided with a chamber at one end of said anti-friction device, means for restricting the passage of air between the housing and shaft at the end adjacent said chamber, and means for reducing the air pressure in said chamber, whereby air is drawn through the anti-friction device to remove lubricant therefrom.

2. In a device of the class described, the combination of a shaft, a bearing housing surrounding said shaft, an anti-friction device in said housing, said housing being provided with a chamber at one end of said anti-friction device, means for restricting the passage of air between the housing and shaft at the end adjacent said chamber, said housing being provided with a pair of aligning holes opening into said chamber, the axis of said holes being positioned tangentially to the shaft, and means for withdrawing air through one of said holes to reduce the pressure in said chamber, whereby air is drawn through the anti-friction device to remove lubricant therefrom.

3. In a device of the class described, the combination of a shaft, a bearing housing surrounding said shaft, an anti-friction device in said housing, said housing being provided with a chamber at one end of said anti-friction device, means for restricting the passage of air between the housing and shaft at the end adjacent said chamber, said housing being provided with a pair of aligning holes opening into said chamber, the axis of said holes being positioned tangentially to the shaft, and a tube extending through one of said openings and terminating adjacent the other, whereby an ejector is provided for reducing the pressure in said chamber to withdraw lubricant from said anti-friction device.

4. In a device of the class described, the combination of a shaft, a bearing housing surrounding said shaft, an anti-friction device in said housing, said housing being provided at one end of the anti-friction device with a chamber having a sump, means for restricting the passage of air between the housing and shaft at the end adjacent said chamber, said housing being provided with upper and lower aligning holes opening into said chamber, the lower hole terminating in said sump, the axis of the holes being positioned tangentially to the shaft, and a removable tube extending through the upper hole and terminating adjacent the lower hole, whereby an ejector is provided for reducing the pressure in the chamber to withdraw lubricant from the anti-friction device.

5. The combination with a motor casing including an end plate, inner and outer caps secured to said end plate, one of said caps being provided with an air chamber, an anti-friction bearing enclosed between said caps, means for restricting the entrance of air around the shaft at the end of the bearing adjacent the air chamber, and means for reducing the air pressure in said chamber, whereby air is caused to enter the chamber through the anti-friction bearing to remove lubricant therefrom.

6. The combination with a motor casing including an end plate and a blower shield, inner and outer caps carried by the end plate, one of said caps being provided with an air chamber having a sump, an anti-friction bearing enclosed between said caps, means for restricting the entrance of air around the shaft at the end of the bearing adjacent the air chamber, a pair of aligning pipes extending from the cap having the air chamber to the periphery of the blower shield, one of the pipes entering the air chamber at the sump, and an air pressure tube adapted to be inserted through the other of said pipes to provide an ejector to withdraw air from the chambers and thereby cause air to enter through the anti-friction bearing to remove lubricant therefrom.

OTTO WULFERT.